(12) United States Patent
Shu et al.

(10) Patent No.: US 10,740,564 B2
(45) Date of Patent: Aug. 11, 2020

(54) DIALOG GENERATION METHOD, APPARATUS, AND DEVICE, AND STORAGE MEDIUM

(71) Applicant: TENCENT TECHNOLOGY (SHENZHEN) COMPANY LIMITED, Shenzhen, Guangdong (CN)

(72) Inventors: Yue Shu, Shenzhen (CN); Yan Xiong Lu, Shenzhen (CN); Fen Lin, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 173 days.

(21) Appl. No.: 15/997,912

(22) Filed: Jun. 5, 2018

(65) Prior Publication Data
US 2018/0285348 A1  Oct. 4, 2018

Related U.S. Application Data

(63) Continuation of application No. PCT/CN2017/093417, filed on Jul. 18, 2017.

(30) Foreign Application Priority Data

Jul. 19, 2016  (CN) .......................... 2016 1 0567504

(51) Int. Cl.
*G06F 17/27* (2006.01)
*G06F 40/30* (2020.01)
(Continued)

(52) U.S. Cl.
CPC .......... *G06F 40/30* (2020.01); *G06F 16/3329* (2019.01); *G06F 16/3344* (2019.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,974,412 A * 10/1999 Hazlehurst .......... G06F 16/3332
6,347,313 B1 * 2/2002 Ma ........................ G06K 9/6253
707/711

(Continued)

FOREIGN PATENT DOCUMENTS

CN  1952928 A  4/2007
CN  104050256 A  9/2014
(Continued)

OTHER PUBLICATIONS

Wen et al., Latent Intention Dialogue Models, 2017, Proceedings of the 34th International Conference on Machine Learning—vol. 70, pp. 3732-3741 (Year: 2017).*

(Continued)

*Primary Examiner* — Lamont M Spooner
(74) *Attorney, Agent, or Firm* — Sughrue Mion, PLLC (57) ABSTRACT

A dialog generation method, apparatus, and device, and a storage medium are provided. The method includes converting each term in a Kth round of a query sentence into a first word vector, and calculating a positive latent vector and a negative latent vector of each term according to the first word vector, where K denotes a positive integer greater than or equal to 2. A content topic of the Kth round of the query sentence is obtained, and converted into a second word vector. An initial latent vector output for the Kth round of the query sentence is determined according to the second word vector, the positive latent vector of a last term in the Kth round of the query sentence, a latent vector of a last term in a (K-1)th round of a reply sentence output for a (K-1)th (Continued)

round of the query sentence, and an initial latent vector of the (K-1)th round of the reply sentence output for the (K-1)th round of the query sentence. A reply sentence for the Kth round of the query sentence is generated according to the positive latent vector and the negative latent vector of each term in the Kth round of the query sentence and the initial latent vector output for the Kth round of the query sentence.

20 Claims, 5 Drawing Sheets

(51) Int. Cl.

| | | |
|---|---|---|
| *G06F 16/332* | (2019.01) | |
| *G06F 16/33* | (2019.01) | |
| *G06N 3/04* | (2006.01) | |
| *G06N 3/08* | (2006.01) | |
| *G06F 40/35* | (2020.01) | |
| *G06F 40/56* | (2020.01) | |

(52) U.S. Cl.
CPC .......... *G06F 16/3347* (2019.01); *G06F 40/35* (2020.01); *G06F 40/56* (2020.01); *G06N 3/0445* (2013.01); *G06N 3/0454* (2013.01); *G06N 3/084* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................................. 704/9, 1, 10
See application file for complete search history.

(56) References Cited

U.S. PATENT DOCUMENTS

| | | | | |
|---|---|---|---|---|
| 6,654,735 | B1* | 11/2003 | Eichstaedt | G06F 16/9535 707/749 |
| 7,567,958 | B1* | 7/2009 | Alspector | G06Q 30/0255 |
| 7,890,505 | B1* | 2/2011 | Alspector | G06Q 30/0255 707/731 |
| 8,036,261 | B2* | 10/2011 | Tsutsui | H04N 5/765 375/240 |
| 8,060,507 | B2* | 11/2011 | Alspector | G06Q 30/0255 707/731 |
| 9,298,757 | B1* | 3/2016 | Ponvert | G06F 16/22 |
| 9,465,833 | B2* | 10/2016 | Aravamudan | G06F 16/335 |
| 10,331,785 | B2* | 6/2019 | Arthur | G06F 17/2785 |
| 2002/0087314 | A1* | 7/2002 | Fischer | G10L 15/07 704/255 |
| 2006/0101065 | A1* | 5/2006 | Tsutsui | H04N 5/765 |
| 2006/0112036 | A1* | 5/2006 | Zhang | G06F 16/353 706/20 |
| 2011/0125578 | A1* | 5/2011 | Alspector | G06Q 30/0255 705/14.53 |
| 2011/0264640 | A1* | 10/2011 | Fontoura | G06Q 30/0241 707/706 |
| 2014/0236577 | A1 | 8/2014 | Malon et al. | |
| 2014/0280088 | A1* | 9/2014 | Speer | G06F 16/3347 707/723 |
| 2015/0127342 | A1* | 5/2015 | Sharifi | G10L 17/005 704/239 |
| 2015/0169772 | A1* | 6/2015 | Alonso | G06Q 30/0269 707/728 |
| 2016/0189556 | A1 | 6/2016 | Clark et al. | |
| 2017/0286415 | A1* | 10/2017 | Kumar | G06K 9/00456 |
| 2018/0018533 | A1* | 1/2018 | Taranta, II | G06K 9/00416 |
| 2018/0089191 | A1* | 3/2018 | Obasanjo | G06F 16/334 |
| 2018/0137854 | A1* | 5/2018 | Perez | G10L 15/16 |
| 2018/0322206 | A1* | 11/2018 | Sun | G06F 16/9535 |
| 2019/0228070 | A1* | 7/2019 | Lu | G06F 17/2785 |
| 2019/0272326 | A1* | 9/2019 | Arthur | G06F 16/41 |

FOREIGN PATENT DOCUMENTS

| | | |
|---|---|---|
| CN | 104462064 A | 3/2015 |
| CN | 105095444 A | 11/2015 |

OTHER PUBLICATIONS

Serban et al., Multiresolution recurrent neural networks: An application to dialogue response generation, 2017, Thirty-First AAAI Conference on Artificial Intelligence, pp. 3288-3294 (Year: 2015).*
Guu et al., Traversing Knowledge Graphs in Vector Space, 2015, arXiv preprint arXiv:1506.01094, pp. 1-10 (Year: 2015).*
Neelakantan et al., Neural programmer: Inducing latent programs with gradient descent, 2015, arXiv preprint arXiv:1511.04834, pp. 1-18 (Year: 2015).*
Kenter et al., Neural Networks for Information Retrieval, 2017, arXiv:1707.04242v1, pp. 1-4 (Year: 2017).*
Iulian V. Serban et al."Building End-to-End Dialogue Systems Using Generative Hierarchical Neural Network Models", Proceedings of the Thirtieth AAAI Conference on Artificial Intelligence (AAAI-16), 2016, pp. 3776-3783, retrieved from internet <www.aaai.org> (8 pages total).
Communication dated Jun. 28, 2018 issued by the State Intellectual Property Office of People's Republic of China in counterpart application No. 201610567504.0.
International Search Report dated Sep. 29, 2017 issued by the International Searching Authority in application No. PCT/CN2017/093417.

* cited by examiner

DIALOG GENERATION METHOD, APPARATUS, AND DEVICE, AND STORAGE MEDIUM

CROSS-REFERENCE TO RELATED APPLICATIONS

This application is a continuation of International Application No. PCT/CN2017/093417, filed on Jul. 18, 2017, which is based on and claims priority from Chinese Patent Application No. 2016105675040, filed in the Chinese Patent Office on Jul. 19, 2016, the disclosures of each of which are incorporated by reference herein in their entirety.

BACKGROUND

1. Field

The present disclosure relates to the field of speech processing, and in particular, to a dialog generation method, apparatus, and device, and a storage medium.

2. Description of Related Art

In recent years, human-machine interaction manners have changed rapidly. As a new interaction mode, dialog robots attract more attention. In the field of natural language processing, research emphasis is on how to improve correlation of an automatically generated reply sentence in a multi-round dialog, and how to reduce a generation probability of a high-frequency answer, to order to generate a high-quality dialog. A dialog system is an important application direction of natural language processing.

In related art technical solutions, the dialog system may include a rule-based dialog system, a searching-based dialog system, or a generation-type dialog system. The rule-based dialog system has a simple structure and high accuracy, but has a relatively poor generalization capability. The searching-based dialog system requires a relatively large number of corpuses with relatively high quality, otherwise problems such as low recall easily occur. The generation-type dialog system may relatively desirably establish a language model, and may generate a reply sentence corresponding to any input sentence. A modeling manner of the generation-type dialog system may include single-round modeling and multi-round modeling. In a single-round generation-type dialog model, modeling is performed only on a query and reply pair. When a multi-round dialog is processed, contexts are directly spliced into a long query sentence. However, when there are a relatively large number of dialog rounds and a relatively high amount of context content, information compression chaos easily occurs, causing problems such as relatively low quality of a generated reply sentence. In a multi-round generation-type dialog model, modeling is performed on a multi-round query and reply transfer process. However, the model tends to generate a high-frequency answer, and therefore has low accuracy.

SUMMARY

It is an aspect to provide a dialog generation method, apparatus, and device, and a storage medium, so as to resolve a technical problem of low accuracy of dialog generation.

According to an aspect of one or more exemplary embodiments, there is provided a method including converting, by at least one processor, each term in a Kth round of a query sentence into a first word vector, and calculating a positive latent vector and a negative latent vector of each term according to the first word vector, K being a positive integer greater than or equal to 2; obtaining, by the at least one processor, a content topic of the Kth round of the query sentence, and converting the content topic into a second word vector; determining an initial latent vector output for the Kth round of the query sentence according to the second word vector, the positive latent vector of a last term in the Kth round of the query sentence, a latent vector of a last term in a (K−1)th round of a reply sentence output for a (K−1)th round of the query sentence, and an initial latent vector of the (K−1)th round of the reply sentence output for the (K−1)th round of the query sentence; and generating, by the at least one processor, a reply sentence for the Kth round of the query sentence according to the positive latent vector and the negative latent vector of each term in the Kth round of the query sentence and the initial latent vector output for the Kth round of the query sentence.

According to other aspects of one or more exemplary embodiments, there is also provided an apparatus and a computer readable storage medium consistent with the method.

BRIEF DESCRIPTION OF THE DRAWINGS

Exemplary embodiments will now be described with reference to the accompanying drawings, in which.

DETAILED DESCRIPTION

The following clearly and completely describes the technical solutions in the exemplary embodiments with reference to the accompanying drawings in which the exemplary embodiments are illustrated. The described exemplary embodiments are some but not all of the exemplary embodiments. All other exemplary embodiments obtained by a person of ordinary skill in the technology based on the exemplary embodiments without creative effects shall fall within the protection scope of the present disclosure and its accompanying claims.

During implementation of the exemplary embodiments, each term in a $K^{th}$ round of a query sentence is converted into a first word vector, and a positive latent vector and a negative latent vector of each term is calculated according to the first word vector; a content topic of the $K^{th}$ round of the query sentence is obtained, and the content topic is converted into a second word vector; an initial latent vector output for the $K^{th}$ round of the query sentence is determined according to the second word vector, the positive latent vector of the last term in the $K^{th}$ round of the query sentence, a latent vector of the last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence;

and a reply sentence for the K$^{th}$ round of the query sentence is generated according to the positive latent vector and the negative latent vector of each term in the K$^{th}$ round of the query sentence and the initial latent vector output for the K$^{th}$ round of the query sentence. Topic content is added to a dialog generation process, so as to effectively suppress generation of a cross-topic general high-frequency reply sentence, and to improve accuracy of dialog generation.

To better understand exemplary embodiments, the following provides meanings of some technical terms.

Recurrent neural network (RNN): A recurrent neural network may be used to model a time sequence behavior.

Long short-term memory (LSTM): A time recursion neural network that may be understood as a cell structure of the recurrent neural network, that includes an input gate, an output gate and a forgetting gate, and that is applicable to process and predict an important event with a quite long interval and delay in a time sequence.

Gated recurrent unit (GRU): A gated recurrent unit. As a variant RNN neural network, the GRU combines a forgetting gate and an input gate to form a single updating gate. Similarly, a cell state and a hiding state are contained in the updating gate, that is, a unit status is removed, and information is stored directly by outputting. Therefore, the structure is simpler than the LSTM. The GRU is similar to the LSTM. The GRU is applicable to processing of long-time independence, and has a simpler cell structure.

One-hot: A one-hot is a vector. A dimension number of the one-hot is a size of a dictionary. Each dimension corresponds to a word in the dictionary. The one-hot is 1 only at a corresponding position, and is 0 at other positions.

Word vector: A low-dimension (for example, usually 200 dimensions to 300 dimensions) vector with a fixed length is used to represent a term, and has high term correlation and a small vector distance.

Softmax: Promotion of a logistic regression model in a multi-categorization problem.

Biterm topic model (BTM): A main idea of a biterm topic model is counting a co-occurrence word pair (that is, in a word co-occurrence mode) formed by any two words, and resolving a problem of corpus feature sparsity by modeling by using a co-occurrence word pair as a unit.

Figure 1:
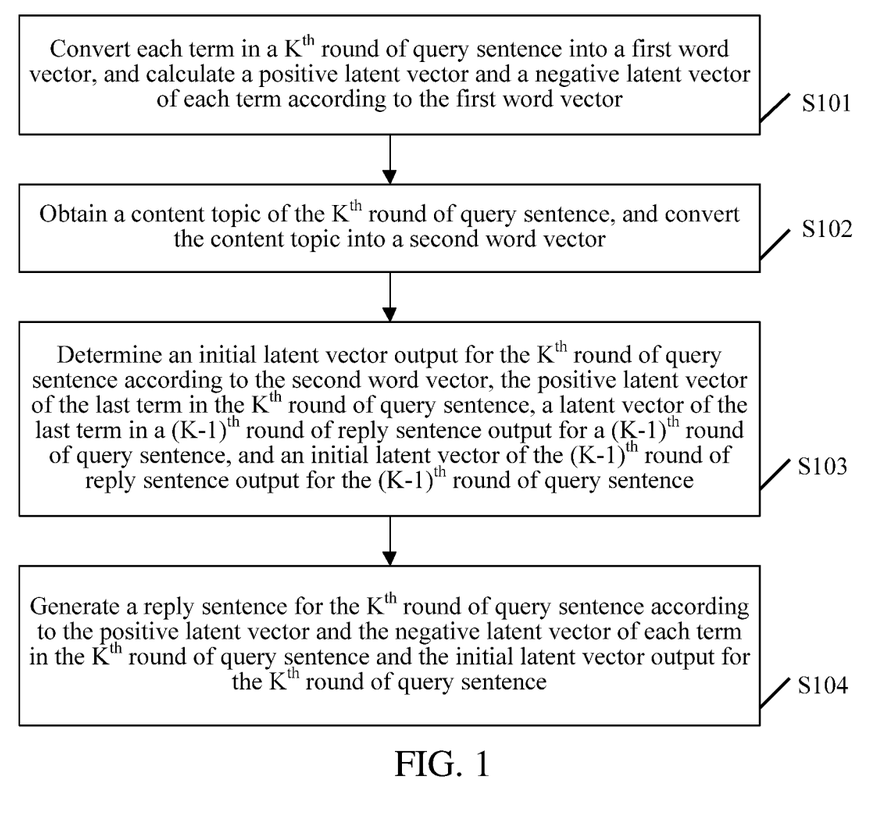
FIG. 1 is a schematic flowchart of a dialog generation method according to an exemplary embodiment.

Referring to FIG. 1, FIG. 1 is a schematic flowchart of a dialog generation method according to an exemplary embodiment. As shown in FIG. 1, the method in this exemplary embodiment includes:

S101: Convert each term in a K$^{th}$ round of a query sentence into a first word vector, and calculate a positive latent vector and a negative latent vector of each term according to the first word vector, K being a positive integer greater than or equal to 2.

Figure 2A:
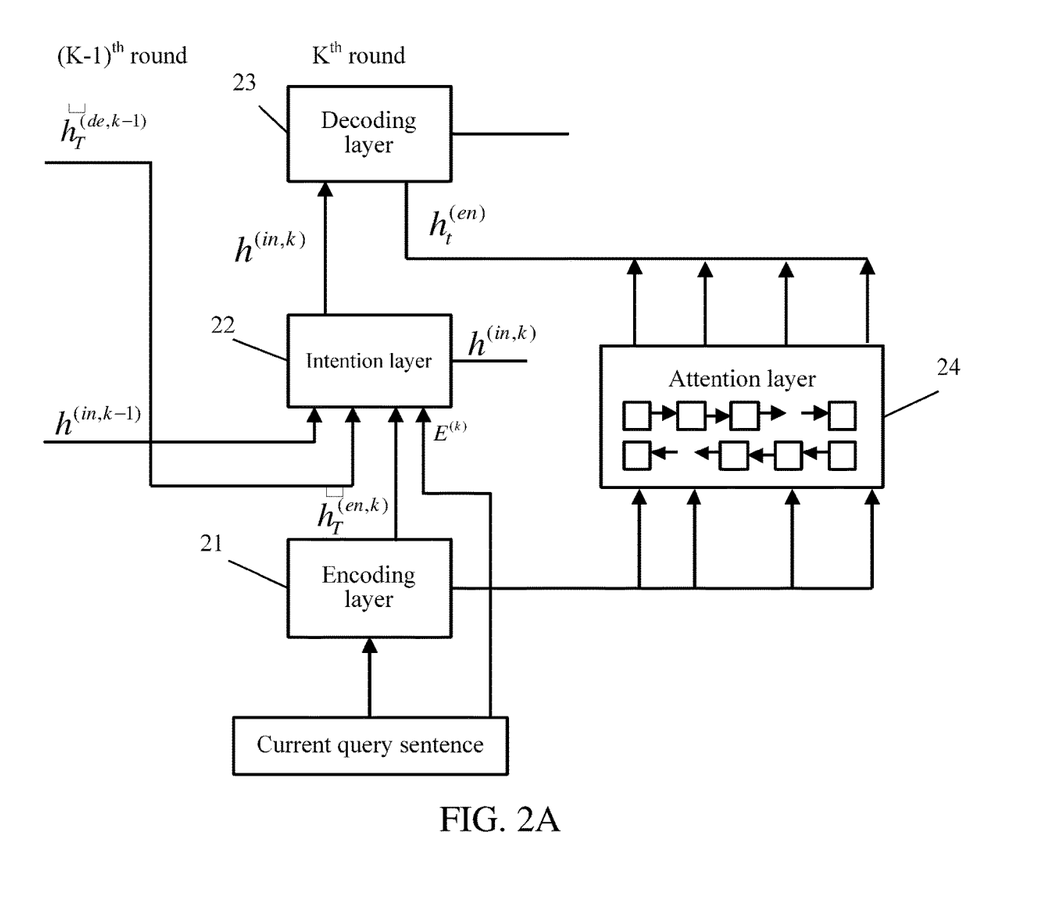
FIG. 2A is a schematic architectural diagram of a dialog generation system according to an exemplary embodiment.

During implementation, a multi-round dialog model may be established. As shown in FIG. 2A, each round of the query sentence and a corresponding reply sentence may be embedded in a single-round dialog model. The multi-round dialog model may be considered as expansion of the single-round dialog model. The single-round dialog model may include an encoding layer, an intention layer, and a decoding layer.

At the encoding layer, the K$^{th}$ round of the query sentence input by a user may be obtained, and word segmentation is performed on the K$^{th}$ round of the query sentence by using a term as a unit. A word vector of each term in the query is represented by using one-hot encoding. The word vector of each term is converted into a vector $x_t^{(en)}$ of a preset dimension by using an embedding space matrix (ESM). A dimension number of the one-hot encoding is a size of a preset dictionary. Each dimension corresponds to a term in the dictionary. The one-hot encoding is 1 only at a corresponding position, and is 0 at other positions. The K$^{th}$ round of the query sentence is scanned from head to tail; the word vector of each term is input to a positive gated recurrent unit in sequence; and a positive latent vector $\vec{h}_t^{(en)}$ after each term is input is recorded. In addition, the K$^{th}$ round of query sentence is scanned from tail to head; the word vector of each term is input to a negative gated recurrent unit; and a negative latent vector $\overleftarrow{h}_t^{(en)}$ after each term is input is recorded.

A positive latent vector of a target term in the K$^{th}$ round of the query sentence may be calculated according to a first word vector of the target term and a positive latent vector of a previous word of the target word. The positive latent vector of the target term may be represented as $$\vec{h}_t^{(en)} = \vec{f}_{en}\left(x_t^{(en)}, \vec{h}_{t-1}^{(en)}\right).$$

A negative latent vector of a target term in the K$^{th}$ round of the query sentence may be calculated according to a first word vector of the target term and a negative latent vector of a next term of the target term. The negative latent vector of the target term may be represented as $$\overleftarrow{h}_t^{(en)} = \overleftarrow{f}_{en}\left(x_t^{(en)}, \overleftarrow{h}_{t-1}^{(en)}\right).$$

For example, the K$^{th}$ round of query sentence may be "ni kan guo dian ying ma?". "ni kan guo dian ying ma" may be positively encoded, to convert each term in the query sentence into a word vector, and the word vectors are respectively $x_1^{(en)}$, $x_2^{(en)}$, $x_3^{(en)}$, $x_4^{(en)}$, $x_5^{(en)}$, and $x_6^{(en)}$. A positive latent vector $\vec{h}_1^{(en)}$ of a first term "ni" is determined according to the word vector $x_1^{(en)}$ of the first term "ni"; a positive latent vector $\vec{h}_2^{(en)}$ of a second term "kan" is determined according to the word vector $x_2^{(en)}$ of the second term "kan" and the positive latent vector $\vec{h}_1^{(en)}$ of the first term "ni"; a positive latent vector $\vec{h}_3^{(en)}$ of a third term "guo" is determined according to the word vector $x_3^{(en)}$ of the third term "guo" and the positive latent vector $\vec{h}_2^{(en)}$ of the second term "kan". The process is repeated, so as to respectively calculate a positive latent vector $\vec{h}_4^{(en)}$ of a fourth term "dian", a positive latent vector $\vec{h}_5^{(en)}$ of a fifth term "ying", and a positive latent vector $\vec{h}_6^{(en)}$ of a sixth word "ma".

In addition, "ni kan guo dian ying ma" may be negatively encoded, to convert each term in the query sentence into a word vector, and the word vectors are respectively $x_1^{(en)}$, $x_2^{(en)}$, $x_3^{(en)}$, $x_4^{(en)}$, $x_5^{(en)}$, and $x_6^{(en)}$. A negative latent vector $\overleftarrow{h}_6^{(en)}$ of a sixth term "ma" is determined according to the word vector $x_6^{(en)}$ of the sixth term "ma"; a negative latent vector $\overleftarrow{h}_5^{(en)}$ of a fifth term "ying" is determined according to the word vector $x_5^{(en)}$ of the fifth term "ying" and the negative latent vector $\overleftarrow{h}_6^{(en)}$ of the sixth term "ma"; a negative latent vector $\overleftarrow{h}_4^{(en)}$ of a fourth term "dian" is determined according to the word vector $x_4^{(en)}$ of the fourth term "dian" and the negative latent vector $\overleftarrow{h}_5^{(en)}$ of the fifth term "ying". The process is repeated, so as to respectively calculate a negative latent vector $\overleftarrow{h}_3^{(en)}$ of a third term "guo", a negative latent vector $\overleftarrow{h}_2^{(en)}$ of a second term "kan", and a negative latent vector $\overleftarrow{h}_1^{(en)}$ of a first term "ni".

S102: Obtain a content topic of the $K^{th}$ round of the query sentence, and convert the content topic into a second word vector.

During implementation, each word of a plurality of words may be trained by using a BTM algorithm, and may be determined as a probability distribution of the content topic. The $K^{th}$ round of the query sentence is matched with the plurality of words, to determine a content topic having a highest probability in the $K^{th}$ round of the query sentence. The content topic having the highest probability may be represented by using one-hot encoding, and an embedding space matrix of the content topic is established, so as to obtain a word vector $E^{(k)}$ of the content topic.

S103: Determine an initial latent vector output for the $K^{th}$ round of the query sentence according to the second word vector, a positive latent vector of the last term in the $K^{th}$ round of the query sentence, a latent vector of the last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence.

During implementation, as shown in FIG. 2A, at the intention layer, the positive latent vector of the last term in the $K^{th}$ round of the query sentence output by the encoding layer 21, the word vector $E^{(k)}$ of the content topic, the latent vector of the last term in the $(K-1)^{th}$ round of a reply sentence output for the $(K-1)^{th}$ round of the query sentence, and the initial latent vector of the $(K-1)^{th}$ round of the reply sentence output for the $(K-1)^{th}$ round of the query sentence may be input to a simple-RNN, to calculate the initial latent vector output for the $K^{th}$ round of the query sentence. The initial latent vector may be represented as:

$$h^{(in,k)} = \sigma\left(W^{(in,in)}h^{(in,k-1)} + W^{(in,de)}h_T^{(de,k-1)} + W^{(in,en)}\overline{h}_T^{(en,k)} + W^{(in,e)}E^{(k)}\right);$$

$W^{(in,in)}$, $W^{(in,de)}$, $W^{(in,en)}$, and $W^{(in,e)}$ denote respectively parameters in the simple-RNN. σ is used to compress the initial the latent vector $h^{(in,k)}$ in an interval of [0, 1], so as to improve a nonlinear representation capability of a model.

It should be noted that, in the process of calculating the initial latent vector, because the content topic in the $K^{th}$ round of the query sentence is added to the intention layer for calculation, which is equivalent to that surveillance information is added to the calculation process, a generated reply sentence may be limited within a range of the content topic, thereby reducing a generation probability of some general high-frequency reply sentences.

S104: Generate a reply sentence for the $K^{th}$ round of the query sentence according to the positive latent vector and the negative latent vector of each term in the $K^{th}$ round of the query sentence and the initial latent vector output for the $K^{th}$ round of the query sentence.

During implementation, the positive latent vector and the negative latent vector of each term in the $K^{th}$ round of the query sentence are spliced to obtain a latent vector of each term in the $K^{th}$ round of the query sentence, where the latent vector of each term is given by $$h_t^{(en)} = \left[\overline{h}_t^{(en)}; \hat{h}_t^{(en)}\right].$$

A second latent vector output for the $K^{th}$ round of the query sentence is determined according to the initial latent vector output for the $K^{th}$ round of the query sentence and a word vector of a preset identification character, and the first reply term to be output for the $K^{th}$ round of the query sentence is determined according to the second latent vector; contribution of each term in the $K^{th}$ round of the query sentence to generation of the second reply term is calculated according to the second latent vector and the latent vector of each term in the $K^{th}$ round of the query sentence; a third latent vector is calculated according to the contribution of each term in the $K^{th}$ round of the query sentence to the generation of the second reply term, the second latent vector, and a word vector of the first reply term; and the second reply term for the $K^{th}$ round of the query sentence is generated according to the third latent vector, and the process is repeated to generate the reply sentence for the $K^{th}$ round of the query sentence.

It should be noted that, key information in a context may be described more accurately by using a latent state of a bidirectional structure as an input of the attention layer, thereby effectively alleviating a problem that key information is close to the end in a unidirectional structure. Because the latent state of the bidirectional structure may increase global information of each term to some extent, a problem that a term closer to the end includes more information in the unidirectional structure, so that correlation of a generated reply sentence is higher.

In another exemplary embodiment, a weight of each term in the $K^{th}$ round of the query sentence for the generation of the second reply term is calculated according to the second latent vector and the latent vector of each term in the $K^{th}$ round of the query sentence; a weighted sum of the latent vector of each term in the $K^{th}$ round of the query sentence is calculated according to the weight of each term in the $K^{th}$ round of the query sentence for the generation of the second reply term, and the weighted sum is used as the contribution of each term in the $K^{th}$ round of the query sentence to the generation of the second reply term.

In another exemplary embodiment, a probability distribution of each term in the preset dictionary may be calculated according to the third latent vector; a term having a highest probability in the preset dictionary may be selected as the second reply term for output, and a third reply term, a fourth reply term, a fifth reply term, and the like may be output in sequence. Each time 50 terms may be selected and a reply sentence is generated term by term, and the first five sentences having a higher probability are selected.

For example, an importance degree $g_{jt}$ of each term in the query sentence to generation of the term is calculated by using a latent vector a previous term of a term in the reply sentence and a latent vector of each term in the query sentence, where $g_{jt} = v^T \tanh(W^{(de,de)}h_{j-1}^{(de)} + W^{(de,en)}h_t^{(en)}$. $h_{j-1}^{(de)}$ denote the latent vector of the previous term of the term, $h_t^{(en)}$ denotes the latent vector of each term in the query sentence, and $W^{(de,de)}$ and $W^{(de,en)}$ denote respectively parameters in a neural network. The importance degree $g_{jt}$ is normalized, to calculate a weight $$a_{jt} = \frac{\exp(g_{jt})}{\sum_m g_{jm}}$$

of a latent vector of each term in the $K^{th}$ round of the query sentence. A weighted sum $C_j = \Sigma_t a_{jt} h_t^{(en)}$ of the latent vector of each term in the $K^{th}$ round of the query sentence is calculated, so as to generate, according to $h_t^{(de)}=f_{de}(x_t^{(de)}, h_{t-1}^{(de)},C_t)$ a latent vector of the reply sentence term by term. $x_t^{(de)}$ denotes a word vector of a previous term of the term, and $h_{t-1}^{(de)}$ denotes a latent vector of a previous term of the term.

Figure 2B:
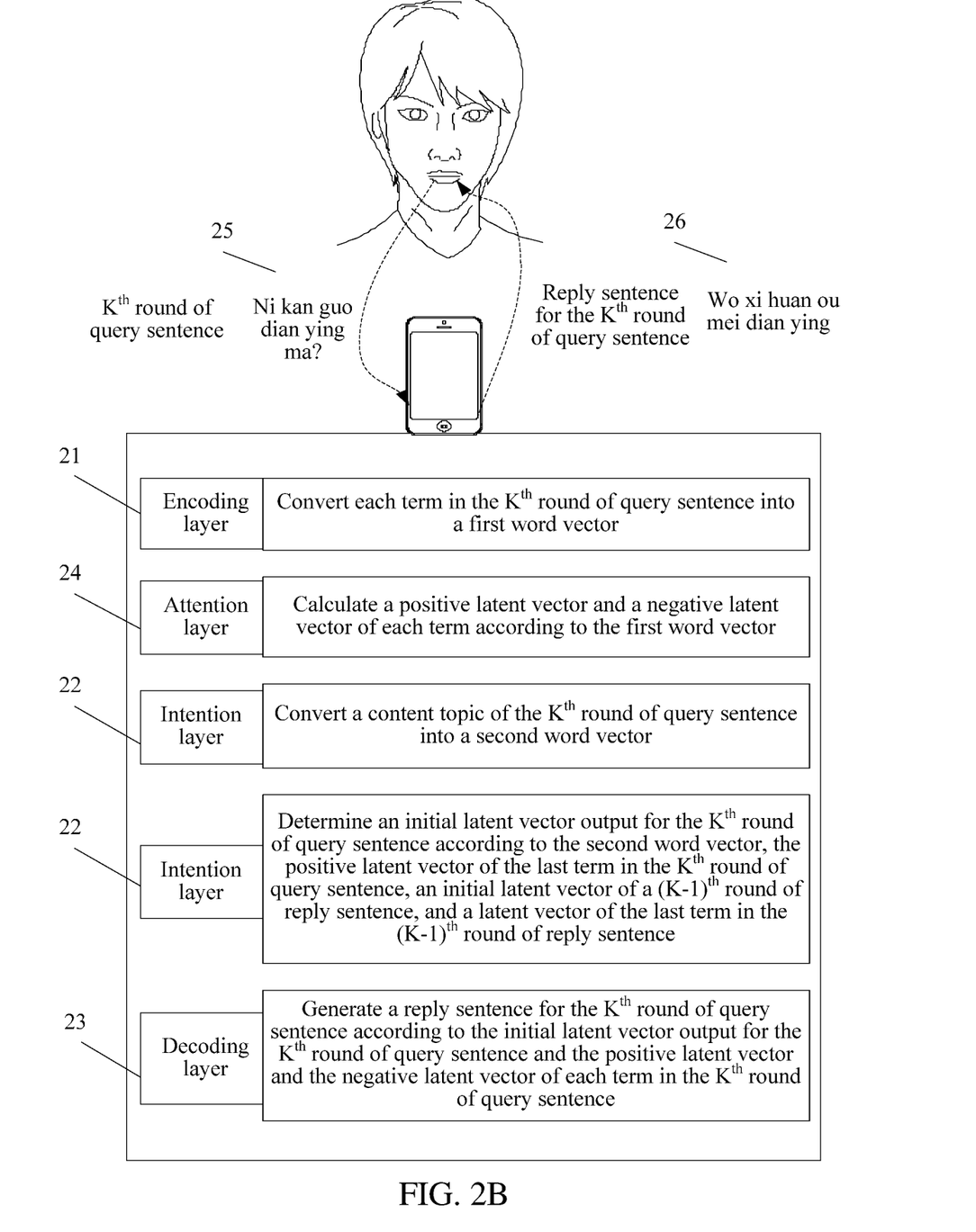
FIG. 2B is a schematic flowchart of a dialog generation method according to an exemplary embodiment.

For the dialog generation method provided in the foregoing exemplary embodiment, refer to FIG. 2B. The following describes implementation steps of the method by using detailed examples:

At the encoding layer 21, word segmentation is performed on a query sentence "ni kan guo dian ying ma" 25 by using a term as a unit, to obtain "ni", "kan" ", guo", "dian", "ying", and "ma". Positive encoding is performed from "ni" to "ma", to form positive latent vectors $$\vec{h}_0, \vec{h}_1, \ldots, \text{ and } \vec{h}_5$$

of the 6 terms, that is, vectors from left to right at the attention layer 24. Negative encoding is performed from "ma" to "ni", to form negative latent vectors $\overleftarrow{h}_0, \overleftarrow{h}_1, \ldots$, and $\overleftarrow{h}_5$ of the 6 terms, that is, vectors from right to left at the attention layer. The positive latent vector and the negative latent vector are serially spliced, to form a latent vector of a term. For example, a latent vector of "ni" in the query sentence is:

$$h_0 = [\vec{h}_0; \overleftarrow{h}_0],$$

where $\vec{h}_0$ denotes a positive latent vector of "ni", and $\overleftarrow{h}_0$ denotes a negative latent vector of "ni". In addition, a positive latent vector $\vec{h}_s$ of the last term "ma" in the query sentence is input to the intention layer.

At the intention layer 22, a content topic of the query sentence "ni kan guo dian ying ma" 25 is calculated as "dian ying", and the content topic "dian ying" is encoded to obtain a topic vector. An output vector of the intention layer in a previous round, an output vector of the decoding layer in the previous round, an output vector of the encoding layer 21 in this round, and the topic vector are all input to the intention layer. An initial latent vector is calculated and output by using a neural network. The initial latent vector may be used to determine the first term of a reply sentence at the decoding layer.

At the decoding layer 23, a process may be considered as a reverse process at the encoding layer 21. The word vectors and the latent vectors may be decoded as a natural language. A reply sentence "wo xi huan ou mei dian ying" may be generated according to the initial latent vector output by the intention layer and the word vector of each term in the query sentence at the attention layer. It is assumed that, in a dictionary of ten thousand terms, each time the decoding layer 23 performs decoding, the decoding layer 23 generates a probability distribution of the ten thousand terms, and selects a term having a highest probability for output each time. The process is as follows:

The intention layer 22 outputs the initial latent vector, inputs the initial latent vector and a word vector whose first character is an identification character "_EOS_" to the decoding layer 23, and updates the latent vector by using a neural network to obtain a second latent vector. The second latent vector generates a probability distribution of ten thousand terms by using a softmax regression algorithm. A term "wo" has a highest probability, and therefore a reply term "wo" is output. The second latent vector and a word vector of the reply term "wo" are used as an input, to generate a third latent vector. A probability distribution of a next term is calculated according to the third latent vector, and a term "xi" having a highest probability is selected for output. The foregoing process is repeated and is ended until the special symbol _EOS_ is output. A reply sentence "wo xi huan ou mei dian ying _EOS_" 26 may be generated.

In this exemplary embodiment, each term in the $K^{th}$ round of a query sentence is converted into the first word vector, and the positive latent vector and the negative latent vector of each term is calculated according to the first word vector; the content topic of the $K^{th}$ round of the query sentence is obtained, and the content topic is converted into the second word vector; the initial latent vector output for the $K^{th}$ round of the query sentence is determined according to the second word vector, the positive latent vector of the last term in the $K^{th}$ round of the query sentence, the latent vector of the last term in the $(K-1)^{th}$ round of a reply sentence output for the $(K-1)^{th}$ round of the query sentence, and the initial latent vector of the $(K-1)^{th}$ round of the reply sentence output for the $(K-1)^{th}$ round of the query sentence; and the reply sentence for the $K^{th}$ round of the query sentence is generated according to the positive latent vector and the negative latent vector of each term in the $K^{th}$ round of the query sentence and the initial latent vector output for the $K^{th}$ round of the query sentence. Topic content is added to the dialog generation process, so as to effectively suppress generation of a cross-topic general high-frequency reply sentence, and to improve accuracy of dialog generation.

In recent years, human-machine interaction manners have changed rapidly. As a new interaction mode, dialog robots attract more attention. Exemplary embodiments relate to the field of computer technologies and machine learning. By means of deep learning technologies, a robot may understand meanings of human natural languages through a multi-round dialog, and generate a corresponding reply sentence. However, how to improve correlation of an automatically generated reply sentence in a multi-round dialog, and how to reduce a generation probability of a high-frequency answer to generate a high-quality dialog are problems to be resolved by related researchers. The technical solutions provided in this exemplary embodiment not only may avoid a low generalization capability of a rule-based dialog system and a low recall capability in a searching algorithm-based dialog system, but also may effectively alleviate a problem of a high generation probability of a high-frequency reply sentence in a mainstream dialog generation system based on counting and learning, thereby improving practicality of a dialog generation algorithm.

Referring to FIG. 2A, based on a multi-round dialog model, a single sentence is encoded by using a GRU unit at the decoding layer 23, to prevent gradient dispersion; dialog topic information based on the BTM algorithm is creatively added to the intention layer 22, and is used as dialog generation surveillance information, so as to reduce a generation probability of a high-frequency answer to some extent; and a bidirectional attention mechanism (the attention layer 24) is used at the decoding layer 23, to capture key information in a context, so that a generated dialog has higher correlation.

According to the dialog generation method based on a multi-round dialog generation model, the method includes two processes, training and prediction. An input of the multi-round dialog generation model is query and reply pairs of the first four rounds of dialogs and a current round of query sentence, and an output of the multi-round dialog generation model is a current round of reply sentence generated by the algorithm according to information of previous texts.

In a training process, if there are, for example, five real rounds of query and reply pairs, a real reply sentence of the last round is selected as surveillance information of a training algorithm, a loss function is calculated by using the generated reply sentence, and a neural network is trained until converges. A query sentence and a reply sentence in each round is embedded in a single-round dialog generation model. In this case, the multi-round dialog generation may be considered as expansion of the single-round dialog generation in time sequence. In the single-round generation model, a processing process includes three parts: processing processes of an encoding layer, an intention layer, and a decoding layer.

1) Encoding layer: The layer is used to map an input natural language to a vector with a fixed dimension. Therefore, an input of the layer is a sentence in a form of a natural language, and an output is a vector with a fixed length. Specifically, the process includes the following steps:

I>. performing word segmentation on the sentence by using a term as unit, and converting a one-hot expression of each term to a word vector $x_t^{(en)}$ of 200 dimensions by using an embedding space matrix;

II>. scanning the sentence from head to tail, inputting a word vector of each term in sequence to a positive GRU network, and recording a latent state $$\vec{h}_t^{(en)} = \vec{f}_{en}\left(x_t^{(en)}, \vec{h}_{t-1}^{(en)}\right)$$

after the term is input;

III>. scanning the sentence from tail to head, inputting a word vector of each term in sequence to a negative GRU network, and recording a latent state $$\overleftarrow{h}_t^{(en)} = \overleftarrow{f}_{en}\left(x_t^{(en)}, \overleftarrow{h}_{t-1}^{(en)}\right)$$

after the term is input;

IV>. using a last state $\vec{h}_T^{(en)}$ in II> as a fixed-length vector expression of the entire sentence, that is, sentence embedding, and using the sentence embedding as an input of the intention layer; and V>. serially splicing the positive latent vector and the negative latent vector that are respectively obtained in II> and III>, that is, $$h_t^{(en)} = \left[\vec{h}_t^{(en)}; \overleftarrow{h}_t^{(en)}\right],$$

using the obtained expression as an expression of the term, and using the expression as an input of the decoding layer. Compared with a unidirectional structure, for a bidirectional structure, when a latent state thereof is used as an input of the intention layer, key information in a context may be described more accurately, thereby effectively alleviating a problem that key information is close to the end in the unidirectional structure. The latent state of the bidirectional structure enables each word to carry global information to some extent, thereby avoiding a problem that a word closer to the end in the unidirectional structure carries more information, so that a generated reply sentence has higher correlation.

2) Intention layer: The layer is used to encode a topic transfer process of a multi-round dialog. An input of the intention layer is $\vec{h}_T^{(en,k)}$ in 1), the last latent state $h_T^{(de,k-1)}$ of the decoding layer in a previous round of query and reply, an output $h^{(in,k-1)}$ of the intention layer in the previous round of query and reply, and a topic $E^{(k)}$ of a current round of query sentence, and an output is a vector $h^{(in,k)}$ obtained by comprehensively encoding the current topic and context information. Specifically, the process includes the following steps:

I>. calculating the topic of the current query sentence, performing offline training by using the BTM algorithm to obtain a topic distribution of each word, calculating online a number of a topic of current query sentence having a highest probability, where the number may be considered as a one-hot expression of the topic, and establishing a topic embedding matrix, to obtain a word vector $E^{(k)}$ of the topic; and II>. calculating topic transfer by using a simple-RNN, where $$h^{(in,k)} = \sigma\left(W^{(in,in)}h^{(in,k-1)} + W^{(in,de)}h_T^{(de,k-1)} + W^{(in,en)}\overline{h}_T^{(en,k)} + W^{(in,e)}E^{(k)}\right),$$

$W^{(in,in)}$, $W^{(in,de)}$, $W^{(in,en)}$, and $W^{(in,e)}$ denote respectively parameters in the simple-RNN, and σ is used to compress the initial latent vector $h^{(in,k)}$ in an interval of [0, 1], to improve a nonlinear representation capability of the model; and using $h^{(in,k)}$ as an input of the decoding layer. In this process, in this exemplary embodiment, the topic of the current query is calculated, which is equivalent to that surveillance information is added to the calculation process, so that generation of a reply sentence in a next step is limited by the topic, thereby reducing a generation probability of some general high-frequency reply sentences.

3) Decoding layer: The layer is used to input a probability distribution of a next term in a dictionary by analyzing the output vectors of the encoding layer and the intention layer. An input is the output $h^{(in,k)}$ of the intention layer and the output $h_t^{(en)}$ of the encoding layer, and an output is a probability distribution of a next term in a dictionary. Specifically, the process includes the following steps:

I>. calculating attention by using $h_t^{(en)}$: calculating an importance degree of a term in a query sentence by using a latent vector of a previous term of the term in a reply sentence and a latent vector of each term in the query sentence, where $g_{jt} = v^T \tanh(W^{(de,de)}h_{j-1}^{(de)} + W^{(de,en)}h_t^{(en)})$, $h_{j-1}^{(de)}$ denotes the latent vector of the previous term of the term, $h_t^{(en)}$ denotes the latent vector of each term in the query sentence, and $W^{(de,de)}$ and $W^{(de,en)}$ denote respectively parameters in a neural network; performing normalization on probabilities by using softmax, to obtain a weight of the attention layer, $$a_{jt} = \frac{\exp(g_{jt})}{\sum_m g_{jm}},$$

that is, calculating an element in the query sentence having highest contribution to generation of the term; and calculating a weighted sum of the latent vector of each term in the query sentence, that is, $C_j = \Sigma_i a_{j,i} h_t^{(en)}$; and II>. generating a next latent state term by term by using a GRU unit according to $h_t^{(de)} = f_{de}(x_t^{(de)}, h_{t-1}^{(de)}, C_t)$, enabling each latent state to access an entire connection layer, and calculating the probability distribution of the next term in the dictionary by using softmax. During training, a loss is calculated by calculating a negative log likelihood of a probability distribution that is of a corresponding term in a standard reply sentence and that is in a predicted reply sentence, a total loss sum of the standard reply sentence is calculated and used as a loss of a current round, and error backhaul is performed by using a back propagation through time (BPTT) algorithm of a recurrent neural network. During prediction, the first 50 terms having a higher probability are selected by using a beam search algorithm of machine learning, a reply sentence is generated term by term, and the first 5 sentences having a higher probability are output.

The technical solutions provided in this exemplary embodiment derive from a translation model. Establishment of the translation model is equivalent space conversion from a language to another language, and therefore semantic space is relatively fixed. In a dialog model, mapping to multi-semantic space is to be performed, because different people provides different replies to a same query sentence. However, for a large amount of data, some general but doctrinal replies such as "Oh, OK" become mainstream in corpuses. As a result, a trained robot tends to use these high-frequency replies. According to the technical solutions provided by the exemplary embodiments, semantic space of sentence generation is reduced by using topic information of a semantic section, thereby suppressing generation of high-frequency meaningless reply sentences to some extent. In addition, a bidirectional attention model is used, so as to capture key semantic information more accurately, thereby ensuring correlation of sentence generation more desirably.

During implementation, the technical solutions provided in this exemplary embodiment may be implemented by using a deep learning frame MXNET 0.5.0, and training and prediction may be performed on Tesla K40. The technical solutions provided in this exemplary embodiment may be applied to service scenarios such as a chat robot, an automatic email reply, and automatic generation of a candidate reply sentence in social software, so as to automatically generate several reply sentences that are more proper according to the first few rounds of dialogs in real time. A generation process is controlled by using an algorithm, without a need of control of a user. For example, the chat robot may automatically reply directly according to an input of a user, thereby achieving a function of emotional accompany. For another example, in the service of automatically generating a candidate reply sentence, several candidate reply sentences are generated for a user according to statuses of the first few rounds of chats, and when it is not convenient for the user to enter a reply, the service may provide a rapid reply for the user.

Figure 3:
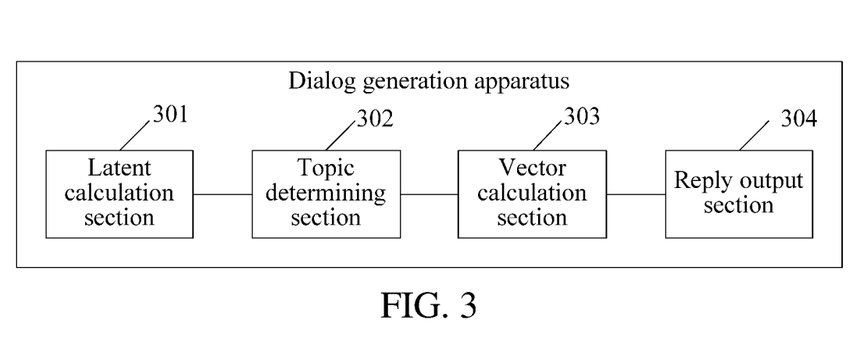
FIG. 3 is a schematic structural diagram of a dialog generation apparatus according to an exemplary embodiment.

Referring to FIG. 3, FIG. 3 is a schematic structural diagram of a dialog generation apparatus according to an exemplary embodiment. Each part included in the apparatus may be implemented by using a dialog generation device, for example, a processor in a terminal such as a mobile phone, a tablet computer, or a personal computer. Certainly, a function implemented by the processor may also be implemented by using a logic circuit. During implementation, the processor may be a central processing unit (CPU), a microprocessor (MPU), a digital signal processor (DSP), a field programmable gate array (FPGA), or the like. As shown in FIG. 3, the apparatus in this exemplary embodiment includes: a latent calculation section 301, a topic determining section 302, and a reply input section 304

The latent calculation section 301 is configured to: convert each term in a $K^{th}$ round of a query sentence into a first word vector, and calculate a positive latent vector and a negative latent vector of each term according to the first word vector, K being a positive integer greater than or equal to 2.

During implementation, a multi-round dialog model may be established. As shown in FIG. 2A, each round of query sentence and a corresponding reply sentence may be embedded in a single-round dialog model. The multi-round dialog model may be considered as expansion of the single-round dialog model. The single-round dialog model may include an encoding layer, an intention layer, and a decoding layer.

At the encoding layer, the $K^{th}$ round of query sentence input by a user may be obtained, and word segmentation is performed on the $K^{th}$ round of query sentence by using a term as a unit. A word vector of each term in the query is represented by using one-hot encoding. The word vector of each term is converted into a vector $x_t^{(en)}$ of a preset dimension by using an ESM. A dimension number of the one-hot encoding is a size of a preset dictionary. Each dimension corresponds to a term in the dictionary. The one-hot encoding is 1 only at a corresponding position, and is 0 at other positions. The $K^{th}$ round of the query sentence is scanned from head to tail; the word vector of each term is input to a positive gated recurrent unit in sequence; and a positive latent vector $\vec{h}_t^{(en)}$ after each term is input is recorded. In addition, the $K^{th}$ round of the query sentence is scanned from tail to head; the word vector of each term is input to a negative gated recurrent unit; and a negative latent vector $\overleftarrow{h}_t^{(en)}$ after each term is input is recorded.

A positive latent vector of a target term in the $K^{th}$ round of the query sentence may be calculated according to a first word vector of the target term and a positive latent vector of a previous word of the target word. The positive latent vector of the target term may be represented as $$\vec{h}_t^{(en)} = \vec{f}_{en}\left(x_t^{(en)}, \vec{h}_{t-1}^{(en)}\right).$$

A negative latent vector of a target term in the $K^{th}$ round of the query sentence may be calculated according to a first word vector of the target term and a negative latent vector of a next term of the target term. The negative latent vector of the target term may be represented as $$\overleftarrow{h}_t^{(en)} = \overleftarrow{f}_{en}\left(x_t^{(en)}, \overleftarrow{h}_{t-1}^{(en)}\right).$$

For example, the $K^{th}$ round of query sentence may be "ni kan guo dian ying ma?". "ni kan guo dian ying ma" may be positively encoded, to convert each term in the query sentence into a word vector, and the word vectors are respectively $x_1^{(en)}$, $x_2^{(en)}$, $x_3^{(en)}$, $x_4^{(en)}$, $x_5^{(en)}$, and $x_6^{(en)}$. A positive latent vector $x_1^{(en)}$ of a first term "ni" is determined according to the word vector $\vec{h}_1^{(en)}$ of the first term "ni"; a positive latent vector $x_2^{(en)}$ of a second term "kan" is determined according to the word vector $\vec{h}_2^{(en)}$ of the second term "kan" and the positive latent vector $\vec{h}_1^{(en)}$ of the first term "ni"; a positive latent vector $x_3^{(en)}$ of a third term "guo" is determined according to the word vector $\vec{h}_3^{(en)}$ of the third term "guo" and the positive latent vector $\bar{h}_3^{(en)}$ of the second term "kan". The process is repeated, so as to respectively calculate a positive latent vector $\bar{h}_4^{(en)}$ of a fourth term "dian", a positive latent vector $\bar{h}_5^{(en)}$ of a fifth term "ying", and a positive latent vector $\bar{h}_6^{(en)}$ of a sixth word "ma".

In addition, "ni kan guo dian ying ma" may be negatively encoded, to convert each term in the query sentence into a word vector, and the word vectors are respectively $x_1^{(en)}$, $x_2^{(en)}$, $x_3^{(en)}$, $x_4^{(en)}$, $x_5^{(en)}$, and $x_6^{(en)}$. A negative latent vector $x_6^{(en)}$ of a sixth term "ma" is determined according to the word vector $\bar{h}_6^{(en)}$ of the sixth term "ma"; a negative latent vector $x_5^{(en)}$ of a fifth term "ying" is determined according to the word vector $\bar{h}_5^{(en)}$ of the fifth term "ying" and the negative latent vector $\bar{h}_6^{(en)}$ of the sixth term "ma"; a negative latent vector $x_4^{(en)}$ of a fourth term "dian" is determined according to the word vector $\bar{h}_4^{(en)}$ of the fourth term "dian" and the negative latent vector $\bar{h}_5^{(en)}$ of the fifth term "ying". The process is repeated, so as to respectively calculate a negative latent vector $\bar{h}_3^{(en)}$ of a third term "guo", a negative latent vector $\bar{h}_2^{(en)}$ of a second term "kan", and a negative latent vector $\bar{h}_1^{(en)}$ of a first term "ni".

The topic determining section 302 is configured to: obtain a content topic of the $K^{th}$ round of the query sentence, and convert the content topic into a second word vector.

During implementation, each word of a plurality of words may be trained by using a BTM algorithm, and is determined as a probability distribution of the content topic. The $K^{th}$ round of the query sentence is matched with the plurality of words, to determine a content topic having a highest probability in the $K^{th}$ round of the query sentence. The content topic having the highest probability may be represented by using one-hot encoding, and an embedding space matrix of the content topic is established, so as to obtain a word vector $E^{(k)}$ of the content topic.

The vector calculation section 303 is configured to determine an initial latent vector output for the $K^{th}$ round of the query sentence according to the second word vector, the positive latent vector of the last term in the $K^{th}$ round of the query sentence, a latent vector of the last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence.

During implementation, as shown in FIG. 2A, at the intention layer, the positive latent vector of the last term in the $K^{th}$ round of the query sentence output by the encoding layer 21, the word vector $E^{(k)}$ of the content topic, the latent vector of the last term in the $(K-1)^{th}$ round of a reply sentence output for the $(K-1)^{th}$ round of the query sentence, and the initial latent vector of the $(K-1)^{th}$ round of the reply sentence output for the $(K-1)^{th}$ round of the query sentence may be input to a simple RNN, to calculate the initial latent vector output for the $K^{th}$ round of the query sentence. The initial latent vector may be represented as:

$$h^{(in,k)} = \sigma\left(W^{(in,in)}h^{(in,k-1)} + W^{(in,de)}h_T^{(de,k-1)} + W^{(in,en)}\bar{h}_T^{(en,k)} + W^{(in,e)}E^{(k)}\right).$$

$W^{(in,in)}$, $W^{(in,de)}$, $W^{(in,en)}$, and $W^{(in,e)}$ denote respectively parameters in the simple-RNN. $\sigma$ is used to compress the initial the latent vector $h^{(in,k)}$ in an interval of [0, 1], so as to improve a nonlinear representation capability of a model.

It should be noted that, in the process of calculating the initial latent vector, because the content topic in the $K^{th}$ round of the query sentence is added to the intention layer for calculation, which is equivalent to that surveillance information is added to the calculation process, a generated reply sentence may be limited within a range of the content topic, thereby reducing a generation probability of some general high-frequency reply sentences.

The reply output section 304 is configured to generate a reply sentence for the $K^{th}$ round of the query sentence according to the positive latent vector and the negative latent vector of each term in the $K^{th}$ round of the query sentence and the initial latent vector output for the $K^{th}$ round of the query sentence.

During implementation, the positive latent vector and the negative latent vector of each term in the $K^{th}$ round of the query sentence are spliced to obtain a latent vector of each term in the $K^{th}$ round of query sentence, where the latent vector of each term $$h_t^{(en)} = \left[\vec{h}_t^{(en)}; \overleftarrow{h}_t^{(en)}\right].$$

A second latent vector output for the $K^{th}$ round of the query sentence is determined according to the initial latent vector output for the $K^{th}$ round of the query sentence and a word vector of a preset identification character, and the first reply term to be output for the $K^{th}$ round of the query sentence is determined according to the second latent vector; contribution of each term in the $K^{th}$ round of the query sentence to generation of the second reply term is calculated according to the second latent vector and the latent vector of each term in the $K^{th}$ round of the query sentence; a third latent vector is calculated according to the contribution of each term in the $K^{th}$ round of the query sentence to the generation of the second reply term, the second latent vector, and a word vector of the first reply term; and the second reply term for the $K^{th}$ round of the query sentence is generated according to the third latent vector, and the process is repeated to generate the reply sentence for the $K^{th}$ round of the query sentence.

It should be noted that, key information in a context may be described more accurately by using a latent state of a bidirectional structure as an input of the attention layer, thereby effectively alleviating a problem that key information is close to the end in a unidirectional structure. Because the latent state of the bidirectional structure may increase global information of each term to some extent, a problem that a term closer to the end carries more information in the unidirectional structure, so that correlation of a generated reply sentence is higher.

In another exemplary embodiment, a weight of each term in the $K^{th}$ round of the query sentence for the generation of the second reply term is calculated according to the second latent vector and the latent vector of each term in the $K^{th}$ round of the query sentence; a weighted sum of the latent vector of each term in the $K^{th}$ round of the query sentence is calculated according to the weight of each term in the $K^{th}$ round of the query sentence for the generation of the second reply term, and the weighted sum is used as the contribution of each term in the $K^{th}$ round of the query sentence to the generation of the second reply term.

In another exemplary embodiment, a probability distribution of each term in the preset dictionary may be calculated according to the third latent vector; a term having a highest probability in the preset dictionary may be selected as the second reply term for output, and a third reply term, a fourth reply term, a fifth reply term, and the like are output in sequence. Each time 50 terms may be selected and a reply sentence is generated term by term, and the first five sentences having a higher probability are selected.

For example, an importance degree $g_{jt}$ of each term in the query sentence to generation of the term is calculated by using a latent vector a previous term of a term in the reply sentence and a latent vector of each term in the query sentence, where $g_{jt}=v^T \text{thanh}(W^{(de,de)}h_{j-1}^{(de)}+W^{(de,en)}h_t^{(en)})$. $h_{j-1}^{(de)}$ denotes the latent vector of the previous term of the term, $h_t^{(en)}$ denotes the latent vector of each term in the query sentence, and $W^{(de,de)}$ and $W^{(de,en)}$ denote respectively parameters in a neural network. The importance degree $g_{jt}$ is normalized, to calculate a weight $$a_{jt} = \frac{\exp(g_{jt})}{\sum_m g_{jm}}$$

of a latent vector of each term in the $K^{th}$ round of query sentence. A weighted sum $C_j=\Sigma_t a_{jt}h_t^{(en)}$ of the latent vector of each term in the $K^{th}$ round of query sentence is calculated, so as to generate, according to $h_t^{(de)}=f_{de}(x_t^{(de)},h_{t-1}^{(de)},C_t)$, a latent vector of the reply sentence term by term. $x_t^{(de)}$ denotes a word vector of a previous term of the term, and $h_{t-1}^{(de)}$ denotes a latent vector of a previous term of the term.

For the dialog generation apparatus provided in the foregoing exemplary embodiment, the following describes implementation steps of the method by using detailed examples:

At the encoding layer, word segmentation is performed on a query sentence "ni kan guo dian ying ma" by using a term as a unit, to obtain "ni", "kan" ", guo", "dian", "ying", and "ma". Positive encoding is performed from "ni" to "ma", to form positive latent vectors $$\vec{h}_0, \vec{h}_1, \ldots, \text{and } \vec{h}_5$$

of the 6 terms, mat is, vectors from left to right at the attention layer 24. Negative encoding is performed from "ma" to "ni", to form negative latent vectors $\overleftarrow{h}_0, \overleftarrow{h}_1, \ldots,$ and $\overleftarrow{h}_5$ of the 6 terms, that is, vectors from right to left at the attention layer. The positive latent vector and the negative latent vector are serially spliced, to form a latent vector of a term. For example, a latent vector of "ni" in the query sentence is:

$$h_0 = [\vec{h}_0; \overleftarrow{h}_0],$$

where $\vec{h}_0$ denotes a positive latent vector of "ni", and $\overleftarrow{h}_0$ denotes a negative latent vector of "ni". In addition, a positive latent vector $\vec{h}_5$ of the last term "ma" in the query sentence is input to the intention layer.

At the intention layer, a content topic of the query sentence "ni kan guo dian ying ma" is calculated as "dian ying", and the content topic "dian ying" is encoded to obtain a topic vector. An output vector of the intention layer in a previous round, an output vector of the decoding layer in the previous round, an output vector of the encoding layer in this round, and the topic vector are all input to the intention layer. An initial latent vector is calculated and output by using a neural network. The initial latent vector may be used to determine the first term of a reply sentence at the decoding layer.

At the decoding layer, a process may be considered as a reverse process at the encoding layer. The word vectors and the latent vectors may be decoded as a natural language. A reply sentence "wo xi huan ou mei dian ying" may be generated according to the initial latent vector output by the intention layer and the word vector of each term in the query sentence at the attention layer. It is assumed that, in a dictionary of ten thousand terms, each time the decoding layer performs decoding, the decoding layer generates a probability distribution of the ten thousand terms, and selects a term having a highest probability for output each time. The process is as follows: the intention layer outputs the initial latent vector, inputs the initial latent vector and a word vector whose first character is an identification character "_EOS_" to the decoding layer, and updates the latent vector by using a neural network to obtain a second latent vector. The second latent vector generates a probability distribution of ten thousand terms by using a softmax regression algorithm. A term "wo" has a highest probability, and therefore a reply term "wo" is output. The second latent vector and a word vector of the reply term "wo" are used as an input, to generate a third latent vector. A probability distribution of a next term is calculated according to the third latent vector, and a term "xi" having a highest probability is selected for output. The foregoing process is repeated and is ended until the special symbol _EOS_ is output. A reply sentence "wo xi huan ou mei dian ying _EOS_" may be generated.

In this exemplary embodiment, each term in the $K^{th}$ round of the query sentence is converted into the first word vector, and the positive latent vector and the negative latent vector of each term is calculated according to the first word vector; the content topic of the $K^{th}$ round of the query sentence is obtained, and the content topic is converted into the second word vector; next, the initial latent vector output for the $K^{th}$ round of the query sentence is determined according to the second word vector, the positive latent vector of the last term in the $K^{th}$ round of the query sentence, the latent vector of the last term in the $(K-1)^{th}$ round of a reply sentence output for the $(K-1)^{th}$ round of the query sentence, and the initial latent vector of the $(K-1)^{th}$ round of the reply sentence output for the $(K-1)^{th}$ round of the query sentence; and the reply sentence for the $K^{th}$ round of the query sentence is generated according to the positive latent vector and the negative latent vector of each term in the $K^{th}$ round of the query sentence and the initial latent vector output for the $K^{th}$ round of the query sentence. Topic content is added to the dialog generation process, so as to effectively suppress generation of a cross-topic general high-frequency reply sentence, and to improve accuracy of dialog generation.

Figure 4:
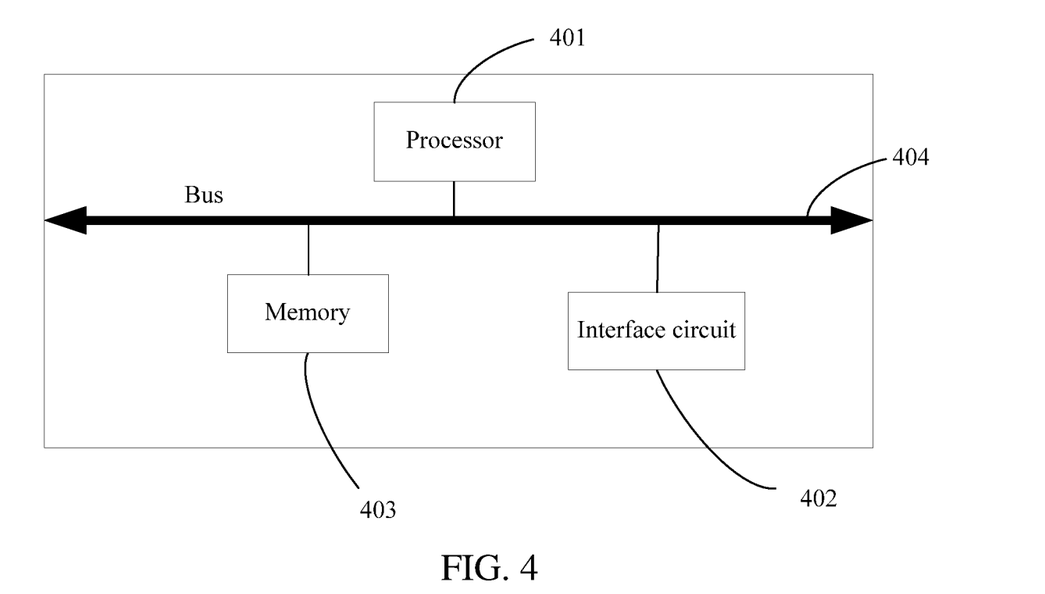
FIG. 4 is a schematic structural diagram of another dialog generation apparatus according to an exemplary embodiment.

Referring to FIG. 4, FIG. 4 is a schematic flowchart of a dialog generation device according to an exemplary embodiment. As shown in the drawing, the device may include: at least one processor 401, such as a CPU, at least one interface circuit 402, at least one memory 403, and at least one bus 404.

The communications bus 404 is configured to implement connection and communication between the components.

The interface circuit 402 in this exemplary embodiment may be a wired sending port, or may be a wireless device, for example, may be an antenna apparatus, and is configured to perform signal or data communicate with another node device.

The memory 403 may be a high-speed RAM memory, or may be a non-volatile memory, for example, at least one magnetic disk memory. In some exemplary embodiments, the memory 403 may alternatively be at least one storage apparatus that is located far away from the processor 401. A group of program code may be stored in the memory 403, and the processor 401 may be configured to: invoke the program code stored in the memory, and perform the following operations:

converting each term in a $K^{th}$ round of a query sentence into a first word vector, and calculating a positive latent vector and a negative latent vector of each term according to the first word vector, K being a positive integer greater than or equal to 2;

obtaining a content topic of the $K^{th}$ round of the query sentence, and converting the content topic into a second word vector;

determining an initial latent vector output for the $K^{th}$ round of the query sentence according to the second word vector, the positive latent vector of the last term in the $K^{th}$ round of the query sentence, a latent vector of the last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence; and generating a reply sentence for the $K^{th}$ round of the query sentence according to the positive latent vector and the negative latent vector of each term in the $K^{th}$ round of the query sentence and the initial latent vector output for the $K^{th}$ round of the query sentence.

The processor 401 is configured to perform the following steps:

calculating a positive latent vector of a target term in the $K^{th}$ round of the query sentence according to a first word vector of the target term and a positive latent vector of a previous term of the target term; or calculating a negative latent vector of a target term in the $K^{th}$ round of the query sentence according to a first word vector of the target term and a negative latent vector of a next term of the target term.

The processor 401 is configured to perform the following steps:

splicing the positive latent vector and the negative latent vector of each term in the $K^{th}$ round of the query sentence to obtain a latent vector of each term in the $K^{th}$ round of the query sentence; and generating the reply sentence for the $K^{th}$ round of the query sentence according to the initial latent vector output for the $K^{th}$ round of the query sentence and the latent vector of each term in the $K^{th}$ round of the query sentence.

The processor 401 is configured to perform the following steps:

determining a second latent vector output for the $K^{th}$ round of the query sentence according to the initial latent vector output for the $K^{th}$ round of the query sentence and a word vector of a preset identification character, and determine the first reply term to be output for the $K^{th}$ round of the query sentence according to the second latent vector;

calculating contribution of each term in the $K^{th}$ round of the query sentence to generation of the second reply term according to the second latent vector and the latent vector of each term in the $K^{th}$ round of the query sentence;

calculating a third latent vector according to the contribution of each term in the $K^{th}$ round of the query sentence to the generation of the second reply term, the second latent vector, and a word vector of the first reply term; and generating the second reply term for the $K^{th}$ round of the query sentence according to the third latent vector, and repeating the process to generate the reply sentence for the $K^{th}$ round of the query sentence.

The processor 401 is configured to perform the following steps:

calculating, according to the second latent vector and the latent vector of each term in the $K^{th}$ round of the query sentence, a weight of each term in the $K^{th}$ round of the query sentence for the generation of the second reply term; and calculating a weighted sum of the latent vector of each term in the $K^{th}$ round of the query sentence according to the weight of each term in the $K^{th}$ round of the query sentence for the generation of the second reply term, and using the weighted sum as the contribution of each term in the $K^{th}$ round of the query sentence to the generation of the second reply term.

The processor 401 is configured to perform the following steps:

calculating a probability distribution of each term in a preset dictionary according to the third latent vector; and selecting a term having a highest probability in the preset dictionary as the second reply term for output.

In the exemplary embodiments, if implemented in the form of software functional parts and sold or used as independent products, the foregoing dialog generation method may be stored in a computer-readable storage medium. Based on such an understanding, the technical solutions of the exemplary embodiments essentially, or the part contributing to related art technologies may be implemented in a form of a software product. The software product may be stored in a storage medium, and includes several instructions for instructing a computer device (which may be a personal computer, a server, or a network device) to perform all or some of the methods described in the exemplary embodiments. The foregoing storage medium includes: any medium that may store program code, such as a USB flash drive, a removable hard disk, a read-only memory (ROM), a magnetic disk, or an optical disc. Therefore, the exemplary embodiments are not limited to any combination of particular hardware and software.

Correspondingly, an exemplary embodiment further provides a computer storage medium, computer executable instructions being stored in the computer storage medium, and the computer executable instructions being used to perform the dialog generation method according to any of the exemplary embodiments described above.

It should be noted that, for ease of description, the foregoing method exemplary embodiments are described as a series of action combinations. However, a person skilled in the technology should understand that the present disclosure is not limited to the described sequence of the actions, because some steps may be performed in another sequence or performed at the same time according to the present disclosure. In addition, a person skilled in the technology should also know that all the exemplary embodiments described in this specification are exemplary embodiments, and the related actions and modules are not necessarily required in the present disclosure.

In the foregoing exemplary embodiments, the description of each exemplary embodiment has respective focuses. For a part that is not described in detail in an exemplary embodiment, refer to related descriptions in other exemplary embodiments.

A person of ordinary skill in the technology may understand that all or some of the steps of the methods in the foregoing exemplary embodiments may be implemented by a program instructing relevant hardware. The program may be stored in a computer readable storage medium. The storage medium may include: a flash drive, a ROM, a random access memory (RAM), a magnetic disk, an optical disc, or the like.

The input method processing method and device and a system provided in the exemplary embodiments are described in detail above. Principles and implementations of the present disclosure have been explained herein with reference to specific exemplary embodiments. The exemplary embodiments are used only to help understand the method and core thought of the present disclosure. Meanwhile, a person with ordinary skills in the technology may have variations in specific implementations and the application scope based on thoughts of the present disclosure. In conclusion, content of the present specification should not be regarded as a limitation on the present disclosure.

In the exemplary embodiments, the reply sentence for the $K^{th}$ round of a query sentence is generated according to the positive latent vector and the negative latent vector of each term in the $K^{th}$ round of the query sentence and the initial latent vector output for the $K^{th}$ round of the query sentence. Topic content is added to the dialog generation process, so as to effectively suppress generation of a cross-topic general high-frequency reply sentence, and to improve accuracy of dialog generation.

What is claimed is:

1. A method comprising:
converting, by at least one processor, each term in a $K^{th}$ round of a query sentence into a first word vector, and calculating a positive latent vector and a negative latent vector of each term according to the first word vector, K being a positive integer greater than or equal to 2;
obtaining, by the at least one processor, a content topic of the $K^{th}$ round of the query sentence, and converting the content topic into a second word vector;
determining an initial latent vector output for the $K^{th}$ round of the query sentence according to the second word vector, the positive latent vector of a last term in the $K^{th}$ round of the query sentence, a latent vector of a last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence; and
generating, by the at least one processor, a reply sentence for the $K^{th}$ round of the query sentence according to the positive latent vector and the negative latent vector of each term in the $K^{th}$ round of the query sentence and the initial latent vector output for the $K^{th}$ round of the query sentence.

2. The method according to claim 1, wherein the calculating comprises:
calculating a positive latent vector of a target term in the $K^{th}$ round of the query sentence according to a first word vector of the target term and a positive latent vector of a previous term of the target term.

3. The method according to claim 1, wherein the calculating comprises:
calculating a negative latent vector of a target term in the $K^{th}$ round of the query sentence according to a first word vector of the target term and a negative latent vector of a next term of the target term.

4. The method according to claim 1, wherein the generating a reply sentence comprises:
splicing the positive latent vector and the negative latent vector of each term in the $K^{th}$ round of the query sentence to obtain a latent vector of each term in the $K^{th}$ round of the query sentence; and
generating the reply sentence for the $K^{th}$ round of the query sentence according to the initial latent vector output for the $K^{th}$ round of the query sentence and the latent vector of each term in the $K^{th}$ round of the query sentence.

5. The method according to claim 4, wherein the generating the reply sentence for the $K^{th}$ round of query sentence according to the initial latent vector output for the $K^{th}$ round of query sentence and the latent vector of each term in the $K^{th}$ round of query sentence comprises:
determining a second latent vector output for the $K^{th}$ round of the query sentence according to the initial latent vector output for the $K^{th}$ round of the query sentence and a word vector of an identification character, and determining a first reply term to be output for the $K^{th}$ round of the query sentence according to the second latent vector;
calculating a contribution of each term in the $K^{th}$ round of the query sentence to generation of a second reply term according to the second latent vector and the latent vector of each term in the $K^{th}$ round of the query sentence;
calculating a third latent vector according to the contribution of each term in the $K^{th}$ round of the query sentence to the generation of the second reply term, the second latent vector, and a word vector of the first reply term; and
generating the second reply term for the $K^{th}$ round of the query sentence according to the third latent vector, and repeating the process to generate the reply sentence for the $K^{th}$ round of the query sentence.

6. The method according to claim 5, wherein the calculating the contribution comprises:
calculating, according to the second latent vector and the latent vector of each term in the $K^{th}$ round of the query sentence, a weight of each term in the $K^{th}$ round of the query sentence for the generation of the second reply term; and
calculating a weighted sum of the latent vector of each term in the $K^{th}$ round of the query sentence according to the weight of each term in the $K^{th}$ round of the query sentence for the generation of the second reply term, and using the weighted sum as the contribution of each term in the $K^{th}$ round of the query sentence to the generation of the second reply term.

7. The method according to claim 5, wherein the generating the second reply term comprises:
calculating a probability distribution of each term in a dictionary according to the third latent vector; and
selecting, based on the probability distribution, a term having a highest probability in the dictionary as the second reply term for output.

8. An apparatus comprising:
at least one memory configured to store computer program code; and
at least one processor configured to access the at least one memory and operate according to the computer program code, the computer program code including:
latent calculation code configured to cause the at least one processor to convert each term in a $K^{th}$ round of a query sentence into a first word vector, and calculate a positive latent vector and a negative latent vector of each term according to the first word vector, K being a positive integer greater than or equal to 2;

topic determining code configured to cause the at least one processor to obtain a content topic of the $K^{th}$ round of the query sentence, and convert the content topic into a second word vector;

vector calculation code configured to cause the at least one processor to determine an initial latent vector output for the $K^{th}$ round of the query sentence according to the second word vector, the positive latent vector of the last term in the $K^{th}$ round of the query sentence, a latent vector of a last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence; and reply output code configured to cause the at least one processor to generate a reply sentence for the $K^{th}$ round of the query sentence according to the positive latent vector and the negative latent vector of each term in the $K^{th}$ round of the query sentence and the initial latent vector output for the $K^{th}$ round of the query sentence.

9. The apparatus according to claim 8, wherein the latent calculation code is configured to cause the at least one processor to:

calculate a positive latent vector of a target term in the $K^{th}$ round of the query sentence according to a first word vector of the target term and a positive latent vector of a previous term of the target term.

10. The apparatus according to claim 8, wherein the latent calculation code is configured to cause the at least one processor to:

calculate a negative latent vector of a target term in the $K^{th}$ round of the query sentence according to a first word vector of the target term and a negative latent vector of a next term of the target term.

11. The apparatus according to claim 8, wherein the reply output code is configured to cause the at least one processor to:

splice the positive latent vector and the negative latent vector of each term in the $K^{th}$ round of the query sentence to obtain a latent vector of each term in the $K^{th}$ round of the query sentence; and generate the reply sentence for the $K^{th}$ round of the query sentence according to the initial latent vector output for the $K^{th}$ round of the query sentence and the latent vector of each term in the $K^{th}$ round of the query sentence.

12. The apparatus according to claim 11, wherein the reply output code is configured to cause the at least one processor to:

determine a second latent vector output for the $K^{th}$ round of the query sentence according to the initial latent vector output for the $K^{th}$ round of the query sentence and a word vector of an identification character, and determine a first reply term to be output for the $K^{th}$ round of the query sentence according to the second latent vector;

calculate contribution of each term in the $K^{th}$ round of the query sentence to generation of a second reply term according to the second latent vector and the latent vector of each term in the $K^{th}$ round of the query sentence;

calculate a third latent vector according to a contribution of each term in the $K^{th}$ round of the query sentence to the generation of the second reply term, the second latent vector, and a word vector of the first reply term; and generate the second reply term for the $K^{th}$ round of the query sentence according to the third latent vector, and repeat the process to generate the reply sentence for the $K^{th}$ round of query sentence.

13. The apparatus according to claim 12, wherein the reply output code is configured to cause the at least one processor to:

calculate, according to the second latent vector and the latent vector of each term in the $K^{th}$ round of the query sentence, a weight of each term in the $K^{th}$ round of the query sentence for the generation of the second reply term; and calculate a weighted sum of the latent vector of each term in the $K^{th}$ round of the query sentence according to the weight of each term in the $K^{th}$ round of the query sentence for the generation of the second reply term, and use the weighted sum as the contribution of each term in the $K^{th}$ round of the query sentence to the generation of the second reply term.

14. The apparatus according to claim 12, wherein the reply output code is configured to cause the at least one processor to:

calculate a probability distribution of each term in a dictionary according to the third latent vector; and select, based on the probability distribution, a term having a highest probability in the dictionary as the second reply term for output.

15. A non-transitory computer readable storage medium, storing computer program code which, when executed by at least one processor, performs the following operations:

converting each term in a $K^{th}$ round of a query sentence into a first word vector, and calculating a positive latent vector and a negative latent vector of each term according to the first word vector, K being a positive integer greater than or equal to 2;

obtaining a content topic of the $K^{th}$ round of the query sentence, and converting the content topic into a second word vector;

determining an initial latent vector output for the $K^{th}$ round of the query sentence according to the second word vector, the positive latent vector of a last term in the $K^{th}$ round of the query sentence, a latent vector of a last term in a $(K-1)^{th}$ round of a reply sentence output for a $(K-1)^{th}$ round of the query sentence, and an initial latent vector of the $(K-1)^{th}$ round of the reply sentence output for the $(K-1)^{th}$ round of the query sentence; and generating a reply sentence for the $K^{th}$ round of the query sentence according to the positive latent vector and the negative latent vector of each term in the $K^{th}$ round of the query sentence and the initial latent vector output for the $K^{th}$ round of the query sentence.

16. The non-transitory computer readable storage medium according to claim 15, wherein the calculating comprises:

calculating a positive latent vector of a target term in the $K^{th}$ round of the query sentence according to a first word vector of the target term and a positive latent vector of a previous term of the target term.

17. The non-transitory computer readable storage medium according to claim 15, wherein the calculating comprises:

calculating a negative latent vector of a target term in the $K^{th}$ round of the query sentence according to a first word vector of the target term and a negative latent vector of a next term of the target term.

18. The non-transitory computer readable storage medium according to claim 15, wherein the generating a reply sentence comprises:

splicing the positive latent vector and the negative latent vector of each term in the $K^{th}$ round of the query sentence to obtain a latent vector of each term in the $K^{th}$ round of the query sentence; and generating the reply sentence for the $K^{th}$ round of the query sentence according to the initial latent vector output for the $K^{th}$ round of the query sentence and the latent vector of each term in the $K^{th}$ round of the query sentence.

19. The non-transitory computer readable storage medium according to claim 18, wherein the generating the reply sentence for the $K^{th}$ round of query sentence according to the initial latent vector output for the $K^{th}$ round of query sentence and the latent vector of each term in the $K^{th}$ round of query sentence comprises:

determining a second latent vector output for the $K^{th}$ round of the query sentence according to the initial latent vector output for the $K^{th}$ round of the query sentence and a word vector of an identification character, and determining a first reply term to be output for the $K^{th}$ round of the query sentence according to the second latent vector;

calculating a contribution of each term in the $K^{th}$ round of the query sentence to generation of a second reply term according to the second latent vector and the latent vector of each term in the $K^{th}$ round of the query sentence;

calculating a third latent vector according to the contribution of each term in the $K^{th}$ round of the query sentence to the generation of the second reply term, the second latent vector, and a word vector of the first reply term; and generating the second reply term for the $K^{th}$ round of the query sentence according to the third latent vector, and repeating the process to generate the reply sentence for the $K^{th}$ round of the query sentence.

20. The non-transitory computer readable storage medium according to claim 19, wherein the calculating the contribution comprises:

calculating, according to the second latent vector and the latent vector of each term in the $K^{th}$ round of the query sentence, a weight of each term in the $K^{th}$ round of the query sentence for the generation of the second reply term; and calculating a weighted sum of the latent vector of each term in the $K^{th}$ round of the query sentence according to the weight of each term in the $K^{th}$ round of the query sentence for the generation of the second reply term, and using the weighted sum as the contribution of each term in the $K^{th}$ round of the query sentence to the generation of the second reply term.

* * * * *